US011886142B2

(12) United States Patent
Momiyama et al.

(10) Patent No.: US 11,886,142 B2
(45) Date of Patent: Jan. 30, 2024

(54) ROTATING DEVICE, TRANSPORTING DEVICE, AND IMAGE FORMING APPARATUS

(71) Applicant: FUJIFILM Business Innovation Corp., Tokyo (JP)

(72) Inventors: Hiroyuki Momiyama, Kanagawa (JP); Hiroyuki Tanaka, Kanagawa (JP); Kohei Takahashi, Kanagawa (JP); Tomoya Kosuge, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/866,568

(22) Filed: Jul. 18, 2022

(65) Prior Publication Data

US 2023/0123366 A1 Apr. 20, 2023

(30) Foreign Application Priority Data

Oct. 20, 2021 (JP) ................................ 2021-171825

(51) Int. Cl.
*G03G 15/00* (2006.01)

(52) U.S. Cl.
CPC ....... *G03G 15/6529* (2013.01); *G03G 15/757* (2013.01)

(58) Field of Classification Search
CPC ......................... G03G 15/6529; G03G 15/757
See application file for complete search history.

(56) References Cited

U.S. PATENT DOCUMENTS

2016/0146292 A1* 5/2016 Matsuda ................ F16H 37/02 399/167

FOREIGN PATENT DOCUMENTS

JP 2007197105 8/2007

* cited by examiner

*Primary Examiner* — Sandra Brase
(74) *Attorney, Agent, or Firm* — JCIPRNET

(57) ABSTRACT

A rotating device includes: a first rotating body capable of forward rotation; a second rotating body capable of forward rotation and reverse rotation; a drive unit outputting drive forces in a forward rotation direction and a reverse rotation direction; and a transmission mechanism transmitting the drive force in the forward rotation direction output from the drive unit to the first rotating body and the second rotating body to rotate the first rotating body and the second rotating body in the forward direction and transmitting the drive force in the reverse rotation direction output from the drive unit to the first rotating body and the second rotating body to rotate the first rotating body in the forward direction and rotate the second rotating body in the reverse direction.

20 Claims, 10 Drawing Sheets

ROTATING DEVICE, TRANSPORTING DEVICE, AND IMAGE FORMING APPARATUS

CROSS-REFERENCE TO RELATED APPLICATIONS

This application is based on and claims priority under 35 USC 119 from Japanese Patent Application No. 2021-171825 filed Oct. 20, 2021.

BACKGROUND

(i) Technical Field

The present invention relates to a rotating device, a transporting device, and an image forming apparatus.

(ii) Related Art

JP2007-197105A discloses an image forming apparatus including an image forming apparatus main body, a main transport path provided in the image forming apparatus main body to transport a sheet on which an image is formed, a discharge path connected to the main transport path and discharging the sheet, a switchback transport path connected above the main transport path and switching back the sheet, and a resupply path provided in the image forming apparatus main body, connected to the switchback transport path, and resupplying the switched-back sheet.

SUMMARY

In a rotating device including a first rotating body and a second rotating body, a plurality of drive units are required and thus the rotating device becomes large in a case where the drive force of a first drive unit is transmitted to rotate the first rotating body and the second rotating body in the forward direction and the drive force of a second drive unit different from the first drive unit is transmitted to rotate the first rotating body in the forward direction and the second rotating body in the reverse direction.

Aspects of non-limiting embodiments of the present disclosure relate to a rotating device, a transporting device, and an image forming apparatus that suppress a rotating device becoming large as compared with a case where the drive force of a first drive unit is transmitted to rotate a first rotating body and a second rotating body in the forward direction and the drive force of a second drive unit different from the first drive unit is transmitted to rotate the first rotating body in the forward direction and the second rotating body in the reverse direction.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

A rotating device includes: a first rotating body capable of forward rotation; a second rotating body capable of forward rotation and reverse rotation; a drive unit outputting drive forces in a forward rotation direction and a reverse rotation direction; and a transmission mechanism transmitting the drive force in the forward rotation direction output from the drive unit to the first rotating body and the second rotating body to rotate the first rotating body and the second rotating body in the forward direction and transmitting the drive force in the reverse rotation direction output from the drive unit to the first rotating body and the second rotating body to rotate the first rotating body in the forward direction and rotate the second rotating body in the reverse direction.

BRIEF DESCRIPTION OF THE DRAWINGS

Exemplary embodiment(s) of the present invention will be described in detail based on the following figures, wherein.

DETAILED DESCRIPTION

Hereinafter, an example of an embodiment according to the present invention will be described with reference to the drawings.

Image Forming Apparatus 10

Figure 1:
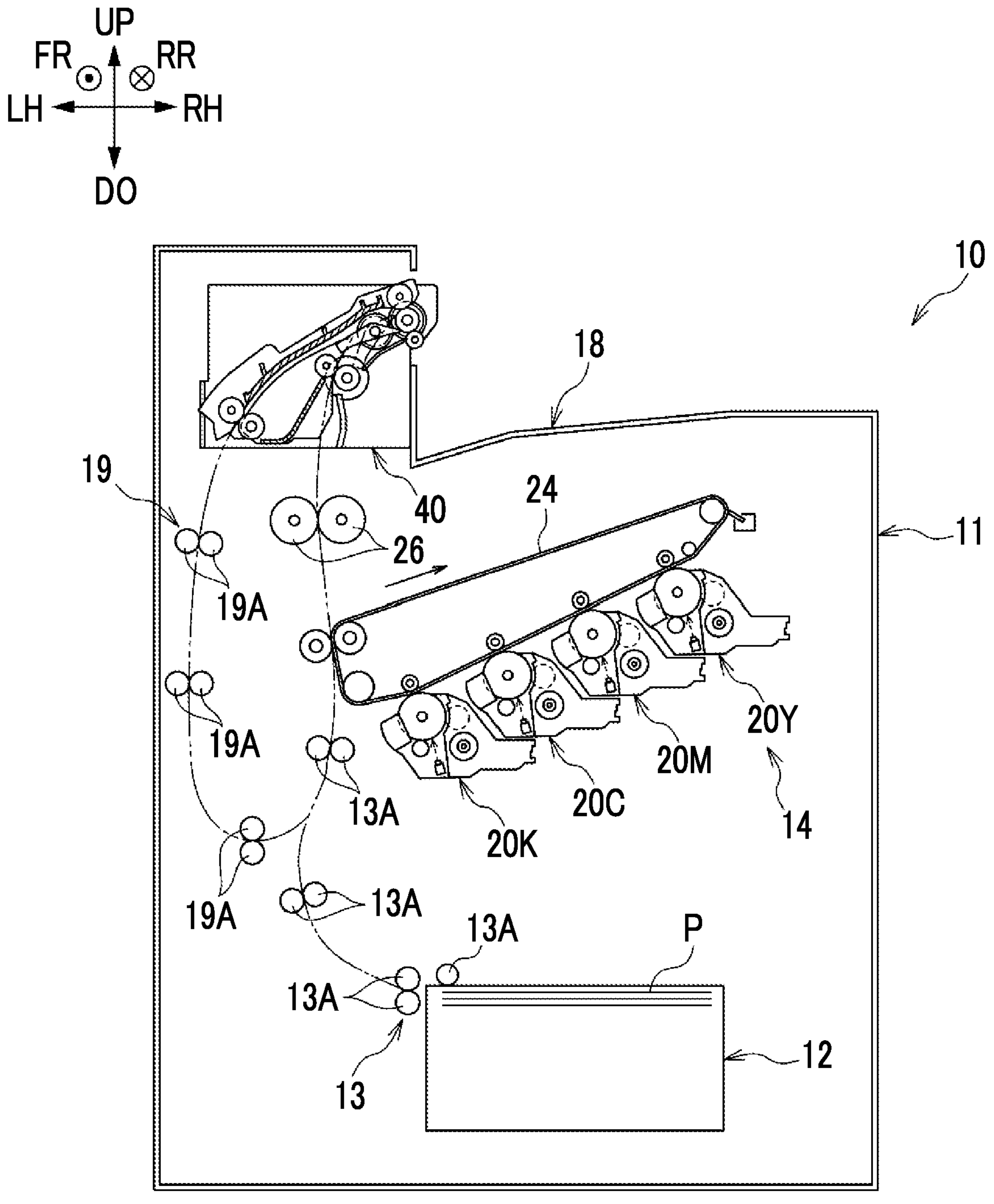
FIG. 1 is a schematic diagram illustrating the configuration of an image forming apparatus according to the present exemplary embodiment.

The configuration of an image forming apparatus 10 according to the present exemplary embodiment will be described. FIG. 1 is a schematic diagram illustrating the configuration of the image forming apparatus 10 according to the present exemplary embodiment.

The arrow UP in the drawings indicates the upper side of the apparatus (specifically, the vertically upper side), and the arrow DO indicates the lower side of the apparatus (specifically, the vertically lower side). In addition, the arrow LH in the drawings indicates the left side of the apparatus, and the arrow RH indicates the right side of the apparatus. In addition, the arrow FR in the drawings indicates the front of the apparatus, and the arrow RR indicates the rear of the apparatus. These directions are for convenience of description, and the apparatus configuration is not limited to these directions. The word "apparatus" may be omitted in each direction of the apparatus. In other words, for example, "upper side of the apparatus" may be simply referred to as "upper side".

The up-down direction, the left-right direction, and the front-rear direction are mutually intersecting directions (specifically, orthogonal directions). In addition, it can be said that the up-down direction is a longitudinal direction. In addition, it can be said that the left-right direction and the front-rear direction are lateral and horizontal directions. In addition, the "X" symbol surrounded by "O" in the drawings means an arrow from the front to the back of the paper. In addition, the "dot" symbol surrounded by "O" in the drawings means an arrow from the back to the front of the paper.

The image forming apparatus 10 illustrated in FIG. 1 is an apparatus that forms an image. Specifically, as illustrated in FIG. 1, the image forming apparatus 10 includes an image forming apparatus main body 11, an accommodating portion 12, a discharge portion 18, a first transporting device 13, an image forming unit 14, a second transporting device 40, and a third transporting device 19. Hereinafter, each part of the image forming apparatus 10 will be described.

Image Forming Apparatus Main Body 11

As illustrated in FIG. 1, the image forming apparatus main body 11 is a part provided with each configuration portion in the image forming apparatus 10. Specifically, for example, the accommodating portion 12, the first transporting device 13, the image forming unit 14, the second transporting device 40, and the third transporting device 19 are disposed in the image forming apparatus main body 11.

Accommodating Portion 12

The accommodating portion 12 is a part in the image forming apparatus 10 that accommodates a recording medium P. The recording medium P accommodated in the accommodating portion 12 is supplied to the image forming unit 14. The recording medium P accommodated in the accommodating portion 12 is an example of a material to be transported and is an object of image formation by the image forming unit 14. Examples of the recording medium P include paper and a film. Examples of the film include a resin film and a metal film. The recording medium P is not limited to the above, and various recording media can be used.

Discharge Portion 18

The discharge portion 18 is a part where the recording medium P is discharged in the image forming apparatus 10. The recording medium P is discharged to the discharge portion 18 with an image formed by the image forming unit 14.

First Transporting Device 13

The first transporting device 13 is a device that transports the recording medium P accommodated in the accommodating portion 12 toward the image forming unit 14. Specifically, as illustrated in FIG. 1, the first transporting device 13 has transport members 13A such as a plurality of transport rolls, and the recording medium P is transported by the transport member 13A.

Image Forming Unit 14

The image forming unit 14 has a function of forming an image on the recording medium P transported by the first transporting device 13. Specifically, the image forming unit 14 forms a toner image (an example of an image) on the recording medium P by an electrophotographic method. More specifically, as illustrated in FIG. 1, the image forming unit 14 has toner image forming units 20Y, 20M, 20C, and 20K (hereinafter, referred to as 20Y to 20K), a transfer body 24, and a fixing unit 26.

In the image forming unit 14, each of the toner image forming units 20Y to 20K performs the processes of charging, exposure, development, and transfer, and yellow (Y), magenta (M), cyan (C), and black (K) toner images are formed on the transfer body 24. Further, the image forming unit 14 transfers the toner image of each color formed on the transfer body 24 to the recording medium P, and the toner image is fixed to the recording medium P by the fixing unit 26. In this manner, the image forming unit 14 uses an intermediate transfer method for transferring an image to the recording medium P via the transfer body 24.

Second Transporting Device 40

Figure 6:
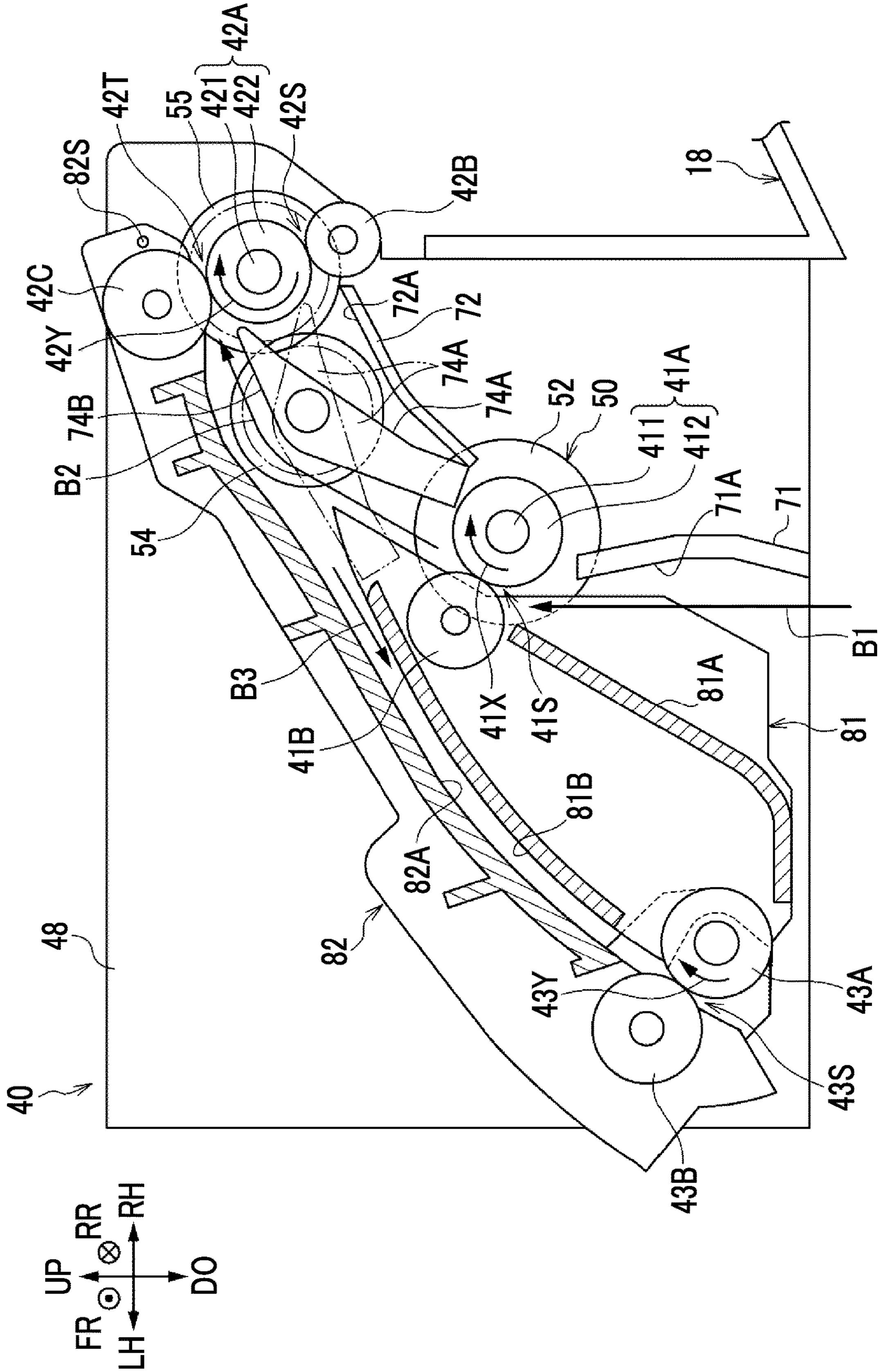
FIG. 6 is a front cross-sectional view of the second transporting device according to the present exemplary embodiment.

The second transporting device 40 is an example of a rotating device and a transporting device and is a device that transports the recording medium P with an image formed by the image forming unit 14. Specifically, the second transporting device 40 discharges the recording medium P on which an image is formed by the image forming unit 14 to the discharge portion 18 or inverts the recording medium P on which an image is formed by the image forming unit 14. In other words, the second transporting device 40 selectively transports the recording medium P on which an image is formed by the image forming unit 14 through one of a discharge path for discharge to the discharge portion 18 and an inversion path for inversion. The discharge path is indicated by the arrows A1, A2, and A3 in FIG. 2. In FIG. 6, the inversion path is configured by a first inversion path indicated by the arrows B1 and B2 and a second inversion path indicated by the arrow B3. In other words, in the second transporting device 40, the recording medium P transported through the first inversion path is transported through the first inversion path and then switched back to be transported through the second inversion path. A specific configuration of the second transporting device 40 will be described later.

Third Transporting Device 19

The third transporting device 19 is a device that transports the recording medium P inverted by the second transporting device 40 toward the image forming unit 14. In other words, the recording medium P inverted by the second transporting device 40 is transported to the image forming unit 14 again. Specifically, as illustrated in FIG. 1, the third transporting device 19 has transport members 19A such as a plurality of transport rolls, and the recording medium P is transported by the transport member 19A.

Specific Configuration of Second Transporting Device 40

Figure 2:
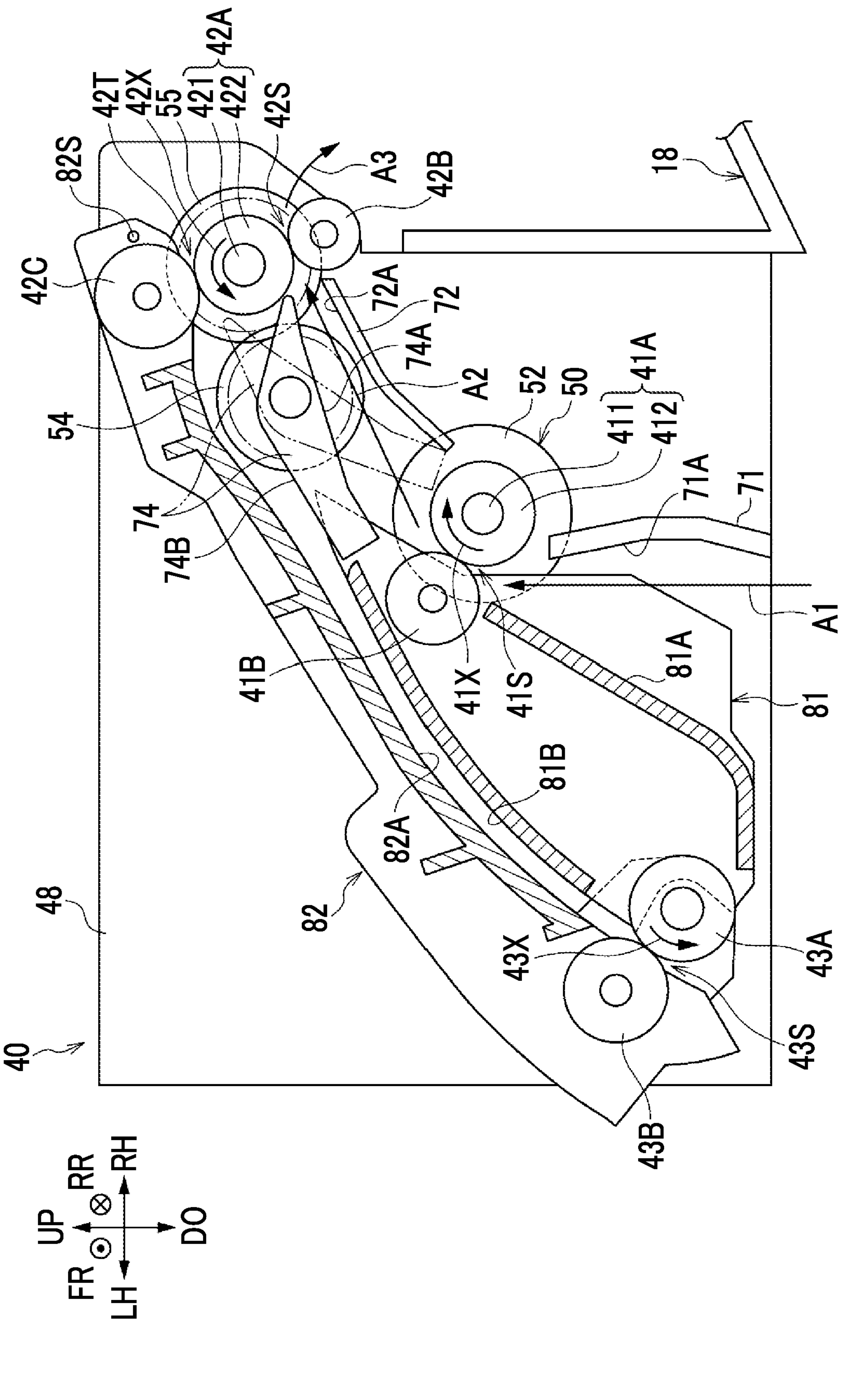
FIG. 2 is a front cross-sectional view of a second transporting device according to the present exemplary embodiment.
Figure 3:
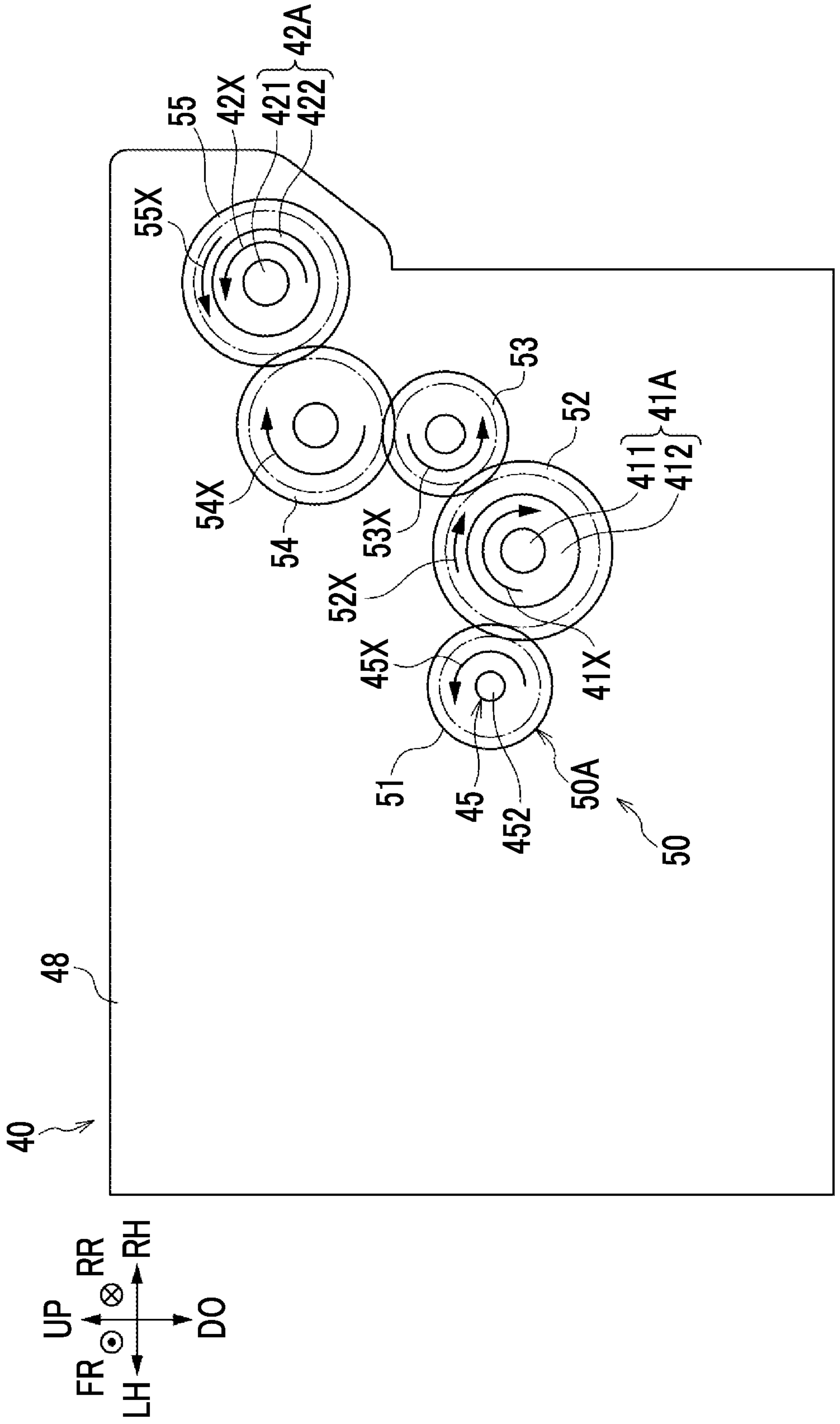
FIG. 3 is a front view illustrating a part of a transmission mechanism in the second transporting device according to the present exemplary embodiment.
Figure 4:
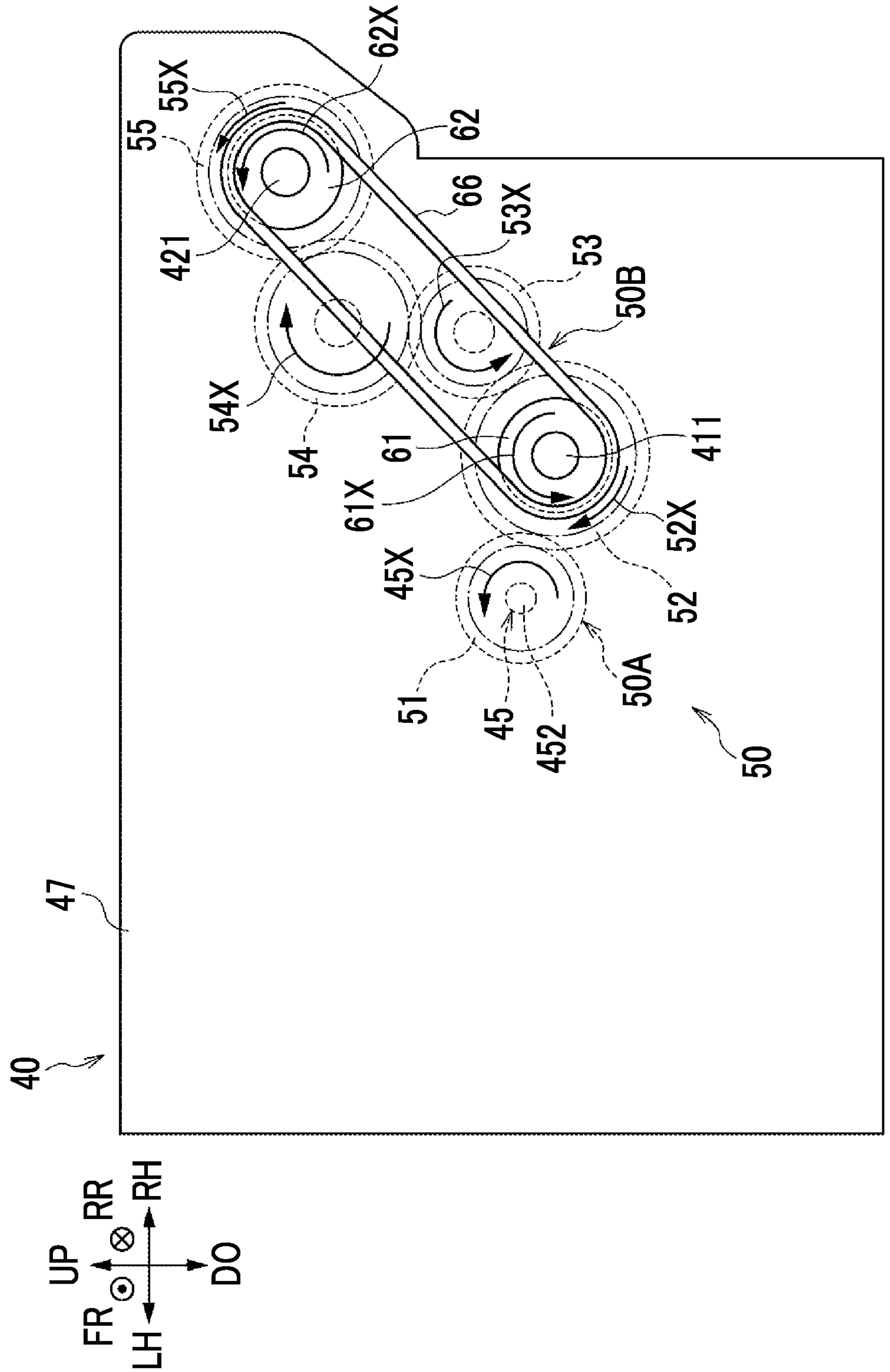
FIG. 4 is a front view illustrating the transmission mechanism in the second transporting device according to the present exemplary embodiment.
Figure 5:
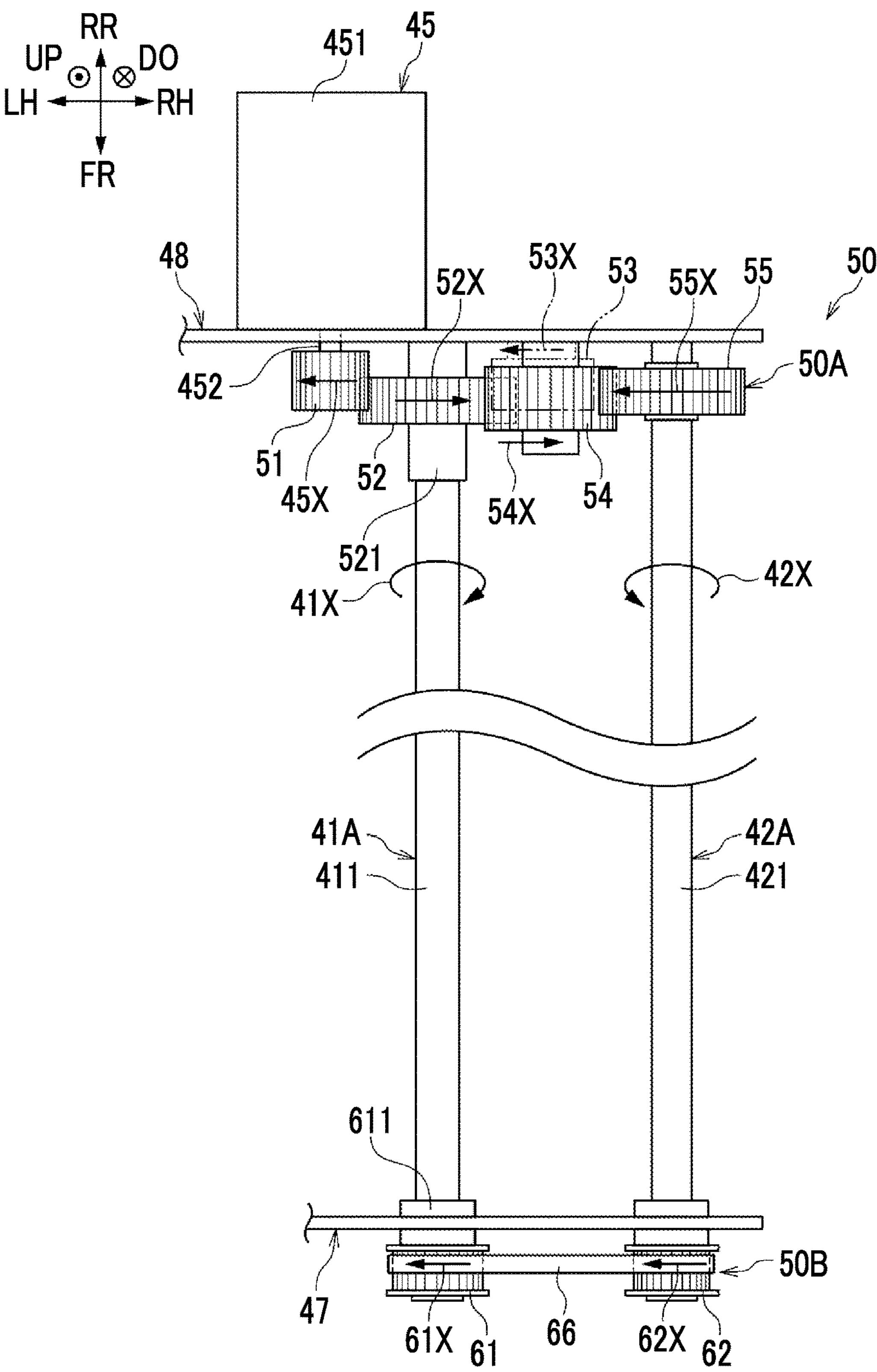
FIG. 5 is a plan view of the second transporting device according to the present exemplary embodiment.
Figure 7:
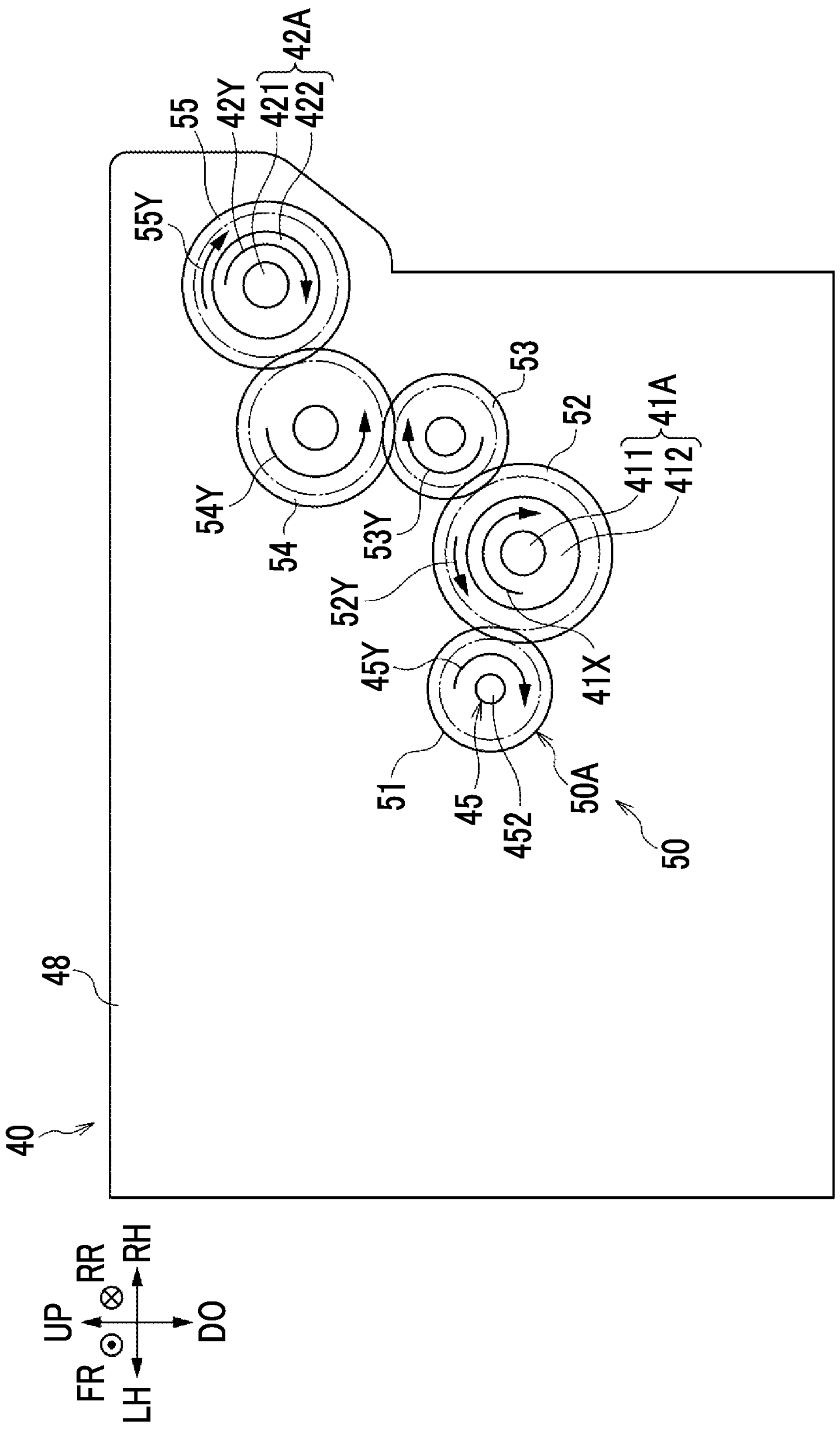
FIG. 7 is a front view illustrating a part of the transmission mechanism in the second transporting device according to the present exemplary embodiment.
Figure 8:
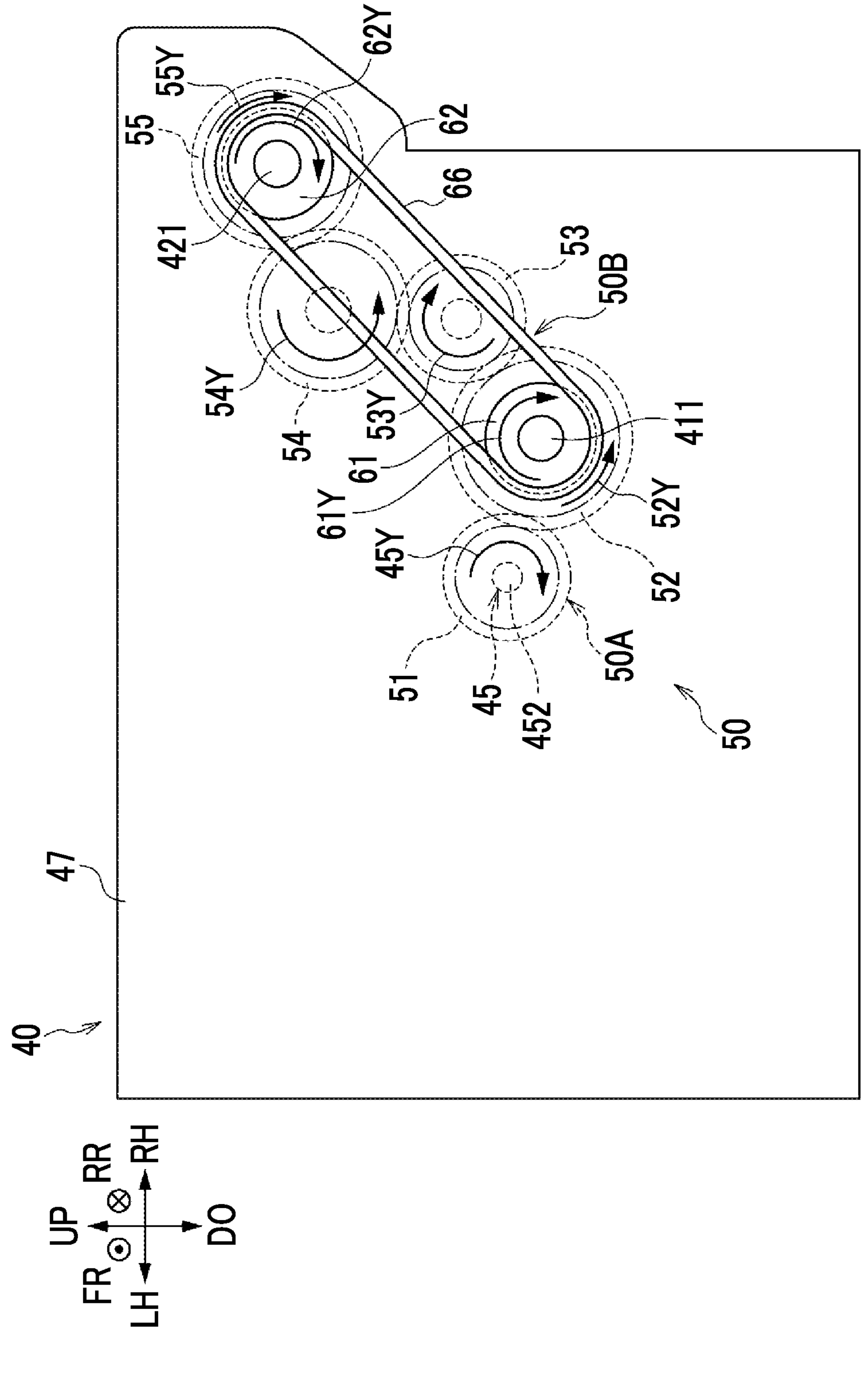
FIG. 8 is a front view illustrating the transmission mechanism in the second transporting device according to the present exemplary embodiment.
Figure 9:
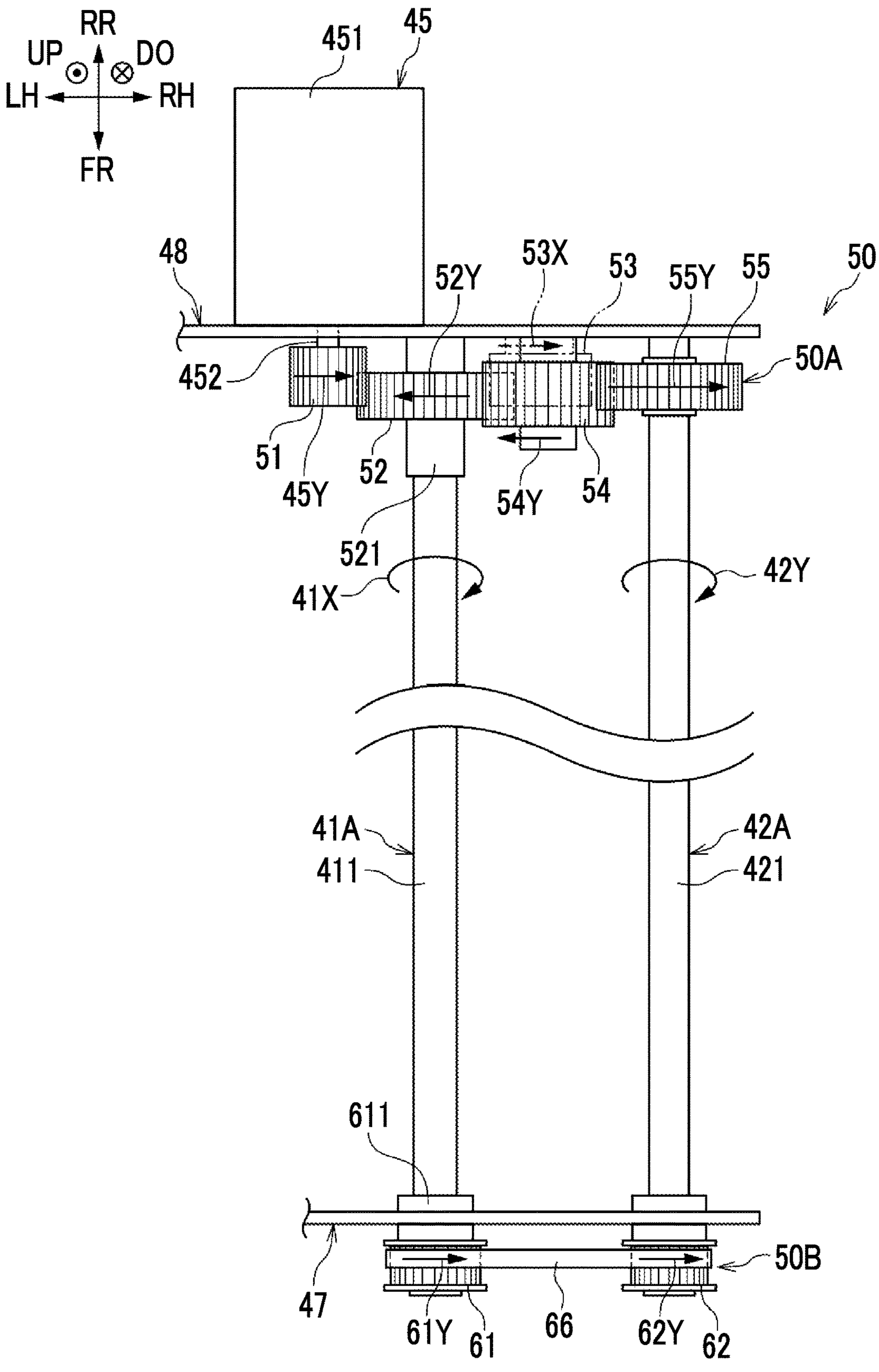
FIG. 9 is a plan view of the second transporting device according to the present exemplary embodiment.

A specific configuration of the second transporting device 40 will be described. FIGS. 2 and 6 are front cross-sectional views of the second transporting device 40. FIGS. 3 and 7 are front views illustrating a part of a transmission mechanism 50 (described later) in the second transporting device 40. FIGS. 4 and 8 are front views illustrating the transmission mechanism 50 (described later) in the second transporting device 40. FIGS. 5 and 9 are plan views of the second transporting device 40.

Figure 10:
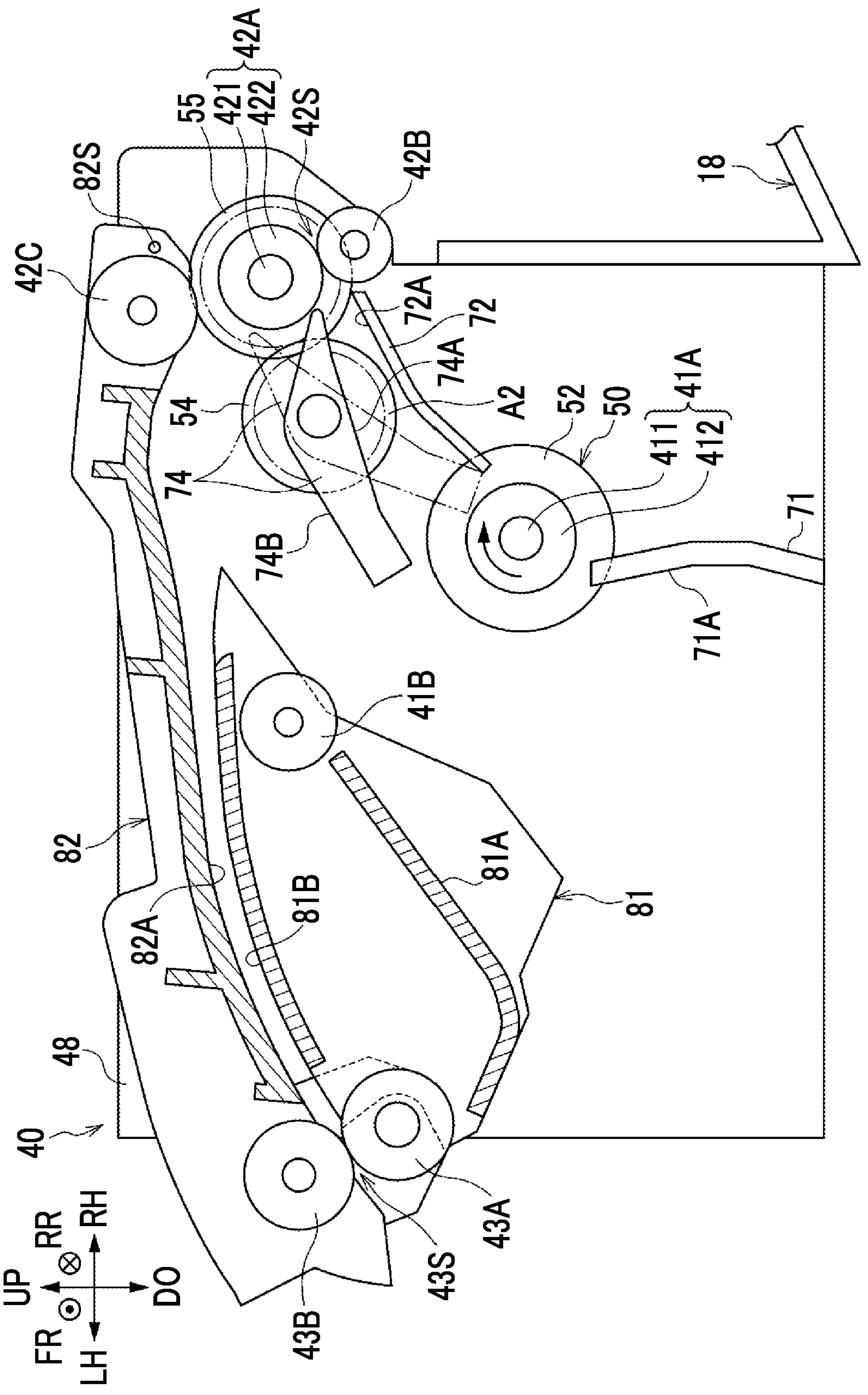
FIG. 10 is a front cross-sectional view illustrating a state where an opening-closing body in the second transporting device according to the present exemplary embodiment is open.

FIGS. 2, 3, 4, and 5 illustrate the second transporting device 40 in a case where the recording medium P is discharged to the discharge portion 18. On the other hand, FIGS. 6, 7, 8, and 9 illustrate the second transporting device 40 in a case where the recording medium P is inverted. In addition, FIG. 10 is a front cross-sectional view illustrating a state where opening-closing bodies 81 and 82 (described later) in the second transporting device 40 are open.

As illustrated in FIGS. 2, 3, 4, and 5, the second transporting device 40 includes support frames 47 and 48, drive rolls 41A, 42A, and 43A, driven rolls 41B, 42B, 42C, and 43B, a drive motor 45, the transmission mechanism 50, guides 71, 72, and 74, and the opening-closing bodies 81 and 82.

Support Frames 47 and 48

The support frames 47 and 48 illustrated in FIG. 5 and the like are examples of a support body and have a function of supporting each configuration portion of the second transporting device 40 including the drive rolls 41A and 42A, the drive motor 45, and the transmission mechanism 50. As illustrated in FIG. 5, the support frames 47 and 48 are formed in, for example, a plate shape in which the front-rear direction is the thickness direction.

The support frame 47 constitutes a front side part in the second transporting device 40 and is disposed on the front side with respect to the support frame 48. The support frame 48 constitutes a rear side part in the second transporting device 40 and is disposed on the rear side with respect to the support frame 47.

Drive Rolls 41A, 42A, and 43A and Driven Rolls 41B, 42B, 42C, and 43B

The drive rolls 41A, 42A, and 43A illustrated in FIG. 2 and the like are transport rolls as driven portions that are rotationally driven by the drive motor 45 (see FIG. 5). Specifically, as illustrated in FIG. 2, the drive rolls 41A and 42A have shaft portions 411 and 421 and roll portions 412 and 422 provided on the outer circumferences of the shaft portions 411 and 421. As illustrated in FIG. 5, the drive rolls 41A and 42A have one and the other end portions (specifically, front and rear end portions) rotatably supported on the respective support frames 47 and 48 by the shaft portions 411 and 421. In FIG. 5, the drive rolls 41A and 42A are illustrated without the roll portions 412 and 422 being illustrated.

The drive roll 41A is an example of a first rotating body and is capable of forward rotation (rotation in the arrow 41X direction). The drive roll 41A is also an example of a first transport member and has a function of transporting the recording medium P by forward rotation. As will be described later, the drive roll 41A rotates in the forward direction by the drive force of the drive motor 45 being transmitted by the transmission mechanism 50.

In addition, as illustrated in FIG. 2, the drive roll 41A has an outer peripheral surface in contact with the outer peripheral surface of the driven roll 41B and has a contact region 41S of contact with the driven roll 41B. By coming into contact with the drive roll 41A in the contact region 41S, the driven roll 41B, which is a transport roll, is driven by the drive roll 41A and rotates. The drive roll 41A and the driven roll 41B are disposed on the downstream side in the transport direction with respect to the image forming unit 14 (specifically, the fixing unit 26) illustrated in FIG. 1. Further, the drive roll 41A and the driven roll 41B transport the recording medium P transported from the image forming unit 14 (specifically, the fixing unit 26) toward the downstream side in the transport direction (specifically, the drive roll 42A) while sandwiching the recording medium P in the contact region 41S. The driven roll 41B is rotatably supported by the opening-closing body 81.

The drive roll 42A is an example of a second rotating body and is capable of forward rotation (rotation in the arrow 42X direction) and reverse rotation (rotation in the arrow 42Y direction). The drive roll 42A is also an example of a second transport member and has a function of transporting the recording medium P by forward rotation and reverse rotation. As will be described later, the drive roll 42A rotates in the forward and reverse directions by the drive force of the drive motor 45 being transmitted by the transmission mechanism 50.

The driven roll 42B is an example of a third transport member and is disposed on one side (specifically, the lower side) with respect to the drive roll 42A. The driven roll 42C is an example of a fourth transport member and is disposed on the side opposite to the driven roll 42B side (specifically, the upper side) with respect to the drive roll 42A.

The drive roll 42A has an outer peripheral surface in contact with the outer peripheral surfaces of the driven rolls 42B and 42C and has contact regions 42S and 42T of contact with the driven rolls 42B and 42C. By coming into contact with the drive roll 42A in the contact regions 42S and 42T, the driven rolls 42B and 42C, which are transport rolls, are driven by the drive roll 42A and rotate. The drive roll 42A and the driven rolls 42B and 42C are disposed on the downstream side in the transport direction with respect to the drive roll 41A and the driven roll 41B. Further, in a case where the recording medium P transported from the drive roll 41A and the driven roll 41B is discharged to the discharge portion 18, the drive roll 42A transports the recording medium P together with the driven roll 42B by forward rotation. Specifically, by the drive roll 42A rotating in the forward direction, the drive roll 42A and the driven roll 42B discharge the recording medium P to the discharge portion 18 through the discharge path (see the arrows A2 and A3) while sandwiching the recording medium P in the contact region 42S. At this time, the guide 74 is positioned at the discharge position (the position indicated by a solid line in FIG. 2).

In addition, in a case where the recording medium P transported from the drive roll 41A and the driven roll 41B is inverted, the drive roll 42A transports the recording medium P together with the driven roll 42C by reverse rotation as illustrated in FIG. 6. Specifically, by the drive roll 42A rotating in the reverse direction, the drive roll 42A and the driven roll 42C transport the recording medium P through the first inversion path (see the arrow B2) while sandwiching the recording medium P in the contact region 42T. At this time, the guide 74 is positioned at the inversion position (the position indicated by a solid line in FIG. 6).

Subsequently, by the drive roll 42A rotating in the forward direction, the drive roll 42A and the driven roll 42C transport the recording medium P through the second inversion path (see the arrow B3). At this time, the guide 74 is positioned at the discharge position (the position indicated by a two-dot chain line in FIG. 6). In this manner, the drive roll 42A and the driven roll 42C invert the recording medium P by the drive roll 42A rotating in the forward direction after rotating in the reverse direction.

The driven roll 42B is rotatably supported by the support frames 47 and 48. In addition, the driven roll 42C is rotatably supported by the opening-closing body 82.

The drive roll 43A is capable of forward rotation (rotation in the arrow 43X direction in FIG. 2) and reverse rotation (rotation in the arrow 43Y direction in FIG. 6). The drive roll 43A has an outer peripheral surface in contact with the outer peripheral surface of the driven roll 43B and has a contact region 43S of contact with the driven roll 43B. By coming into contact with the drive roll 43A in the contact region 43S, the driven roll 43B is driven by the drive roll 43A and rotates. The drive roll 43A and the driven roll 43B are disposed on the downstream side in the transport direction with respect to the drive roll 42A and the driven roll 42C.

Further, the drive roll 43A and the driven roll 43B transport the recording medium P transported from the drive roll 42A and the driven roll 42C toward the downstream side in the transport direction (specifically, the image forming unit 14) while sandwiching the recording medium P in the contact region 43S. The drive roll 43A and the driven roll 43B are rotatably supported by the opening-closing body 82.

Drive Motor 45 and Transmission Mechanism 50

The drive motor 45 illustrated in FIG. 5 and the like is an example of a drive unit and outputs drive forces in the forward rotation direction (the arrow 45X direction in FIG. 3 and the like) and the reverse rotation direction (the arrow 45Y direction in FIG. 7 and the like). As illustrated in FIG. 5, the drive motor 45 has a main body 451 and a drive shaft 452. The main body 451 is fixed to the support frame 48 on the rear side with respect to the support frame 48. The drive shaft 452 extends from the main body 451 to the front side with respect to the support frame 48. A stepping motor, a DC motor (that is, a direct current motor), or the like can be used as the drive motor 45.

The transmission mechanism 50 illustrated in FIG. 5 and the like is a mechanism that transmits the drive force of the drive motor 45 to the drive rolls 41A, 42A, and 43A. In the present exemplary embodiment, the transmission mechanism 50 transmits the drive force in the forward rotation direction (the arrow 45X direction) output from the drive motor 45 to the drive rolls 41A and 42A to rotate the drive rolls 41A and 42A in the forward direction. In addition, the transmission mechanism 50 transmits the drive force in the reverse rotation direction (the arrow 45Y direction) output from the drive motor 45 to the drive rolls 41A and 42A to rotate the drive roll 41A in the forward direction and rotate the drive roll 42A in the reverse direction.

In the present exemplary embodiment, as illustrated in FIGS. 3, 4, and 5, the transmission mechanism 50 has gears 51, 52, 53, 54, and 55, pulleys 61 and 62, a timing belt 66, and one-way clutches 521 and 611 as components.

The gear 51 is fixed to the drive shaft 452 of the drive motor 45. The gear 52, which is an example of a first transmission member, meshes with the gear 51 and is fixed to the rear end portion of the shaft portion 411 of the drive roll 41A via the one-way clutch 521. The gear 52 is a transmission member that transmits the drive force in the forward rotation direction output from the drive motor 45 to the drive roll 41A.

The one-way clutch 521 functions as a transmission unit that transmits the rotational force in the forward rotation direction (the arrow 52X direction in FIG. 3 and the like) of the gear 52 to the shaft portion 411 of the drive roll 41A and does not transmit the rotational force in the reverse rotation direction (the arrow 52Y direction in FIG. 7 and the like) of the gear 52 to the shaft portion 411 of the drive roll 41A. The one-way clutch 521 may be grasped as an example of a first transmission member.

The gear 53 meshes with the gear 52 and is rotatably supported by the support frame 48. The gear 54 meshes with the gear 53 and is rotatably supported by the support frame 48. The gear 55 meshes with the gear 54 and is fixed to the rear end portion of the shaft portion 421 of the drive roll 42A.

The pulley 61, which is an example of a second transmission member, is fixed to the front end portion of the shaft portion 411 of the drive roll 41A via the one-way clutch 611. The pulley 61 is a transmission member that transmits the drive force in the reverse rotation direction output from the drive motor 45 to the drive roll 41A.

The one-way clutch 611 functions as a transmission unit that transmits the rotational force in the reverse rotation direction (the arrow 61Y direction in FIGS. 8, 9, and the like) of the pulley 61 to the shaft portion 411 of the drive roll 41A and does not transmit the rotational force in the forward rotation direction (the arrow 61X direction in FIGS. 4, 5, and the like) of the pulley 61 to the shaft portion 411 of the drive roll 41A. The one-way clutch 611 may be grasped as an example of a second transmission member.

The pulley 62 is fixed to the front end portion of the shaft portion 421 of the drive roll 42A. The pulley 62 is rotatable in the forward rotation direction (the arrow 62X direction) and the reverse rotation direction (the arrow 62Y direction) integrally with the drive roll 42A. The timing belt 66 is formed in an annular shape and is wound around the pulleys 61 and 62. Further, the teeth formed on the inner circumference of the timing belt 66 mesh with the teeth formed on the outer circumferences of the pulleys 61 and 62.

In this manner, in the transmission mechanism 50, the gears 51, 52, 53, 54, and 55 and the one-way clutch 521 are disposed on one axial end side (specifically, the rear end side) of the drive rolls 41A and 42A, and the pulleys 61 and 62, the timing belt 66, and the one-way clutch 611 are disposed on the other axial end side (specifically, the front end side) of the drive rolls 41A and 42A.

The transmission mechanism 50 has a first transmission path 50A and a second transmission path 50B formed by the components described above. The first transmission path 50A transmits the drive force in the forward rotation direction (the arrow 45X direction) output from the drive motor 45 to the drive rolls 41A and 42A to rotate the drive rolls 41A and 42A in the forward direction and does not transmit the drive force in the reverse rotation direction (the arrow 45Y direction) output from the drive motor 45 to the drive roll 41A.

The second transmission path 50B transmits the drive force in the reverse rotation direction (the arrow 45Y direction) output from the drive motor 45 to the drive rolls 41A and 42A to rotate the drive roll 41A in the forward direction and rotate the drive roll 42A in the reverse direction and does not transmit the drive force in the forward rotation direction (the arrow 45X direction) output from the drive motor 45 to the drive roll 41A.

As illustrated in FIGS. 3, 4, and 5, in the first transmission path 50A, the drive force in the forward rotation direction (the arrow 45X direction) from the drive motor 45 is transmitted in the order of the gears 51, 52, 53, 54, and 55, and the gears 51, 52, 53, 54, and 55 rotate in the forward rotation direction (the arrow 45X direction, arrow 52X direction, arrow 53X direction, arrow 54X direction, and arrow 55X direction). Further, the rotational force in the forward rotation direction (the arrow 52X direction) of the gear 52 is transmitted to the shaft portion 411 of the drive roll 41A via the one-way clutch 521, and the drive roll 41A rotates in the forward direction. Further, the rotational force in the forward rotation direction (the arrow 55X direction) of the gear 55 is transmitted to the shaft portion 421 of the drive roll 42A, and the drive roll 42A rotates in the forward direction. In this manner, the first transmission path 50A transmits the drive force to the drive roll 41A from one end side (specifically, the rear end side). In addition, the first transmission path 50A is formed by the gears 51, 52, 53, 54, and 55, and the one-way clutch 521.

When the drive roll 42A rotates in the forward direction, the rotational force in the forward rotation direction of the shaft portion 421 of the drive roll 42A is also transmitted to the pulley 62, the timing belt 66, and the pulley 61. However, by the one-way clutch 611 acting, the rotational force is not transmitted to the drive roll 41A in the path from the pulley 61 to the shaft portion 411 of the drive roll 41A (that is, the second transmission path 50B).

As illustrated in FIGS. 7, 8, and 9, in the second transmission path 50B, the drive force in the reverse rotation direction (the arrow 45Y direction) from the drive motor 45 is transmitted in the order of the gears 51, 52, 53, 54, and 55, and the gears 51, 52, 53, 54, and 55 rotate in the reverse rotation direction (the arrow 45Y direction, arrow 52Y direction, arrow 53Y direction, arrow 54Y direction, and arrow 55Y direction). Further, the rotational force in the reverse rotation direction (the arrow 55Y direction) of the gear 52 is transmitted to the shaft portion 421 of the drive roll 42A, and the drive roll 42A rotates in the reverse direction. Further, the rotational force in the reverse rotation direction of the shaft portion 421 of the drive roll 42A is transmitted to the shaft portion 411 of the drive roll 41A via the pulley 62, the timing belt 66, the pulley 61, and the one-way clutch 611, and the drive roll 42A rotates in the forward direction. In this manner, the second transmission path 50B transmits the drive force to the drive roll 41A from the other end side (specifically, the front end side). In addition, the second transmission path 50B is formed by the gears 51, 52, 53, 54, and 55, the pulleys 61 and 62, the timing belt 66, and the one-way clutch 611.

By the one-way clutch 521 acting, the drive force in the reverse rotation direction (the arrow 45Y direction) from the drive motor 45 is not transmitted to the drive roll 41A in the path from the gear 52 to the shaft portion 411 of the drive roll 41A (that is, the first transmission path 50A).

As described above, in the transmission mechanism 50, the drive force in the forward rotation direction (the arrow 45X direction) from the drive motor 45 is transmitted in the path from the gear 52 to the shaft portion 411 of the drive roll 41A (that is, the first transmission path 50A), the drive force in the reverse rotation direction (the arrow 45Y direction) from the drive motor 45 is transmitted in the path from the pulley 61 to the shaft portion 411 of the drive roll 41A (that is, the second transmission path 50B), and the drive roll 41A is rotated in the forward direction as a result. In other words, in the transmission mechanism 50, the drive roll 41A is rotated in the forward direction regardless of whether the drive force output from the drive motor 45 is in the forward rotation direction (the arrow 45X direction) or in the reverse rotation direction (the arrow 45Y direction).

With a transmission member (a gear, a belt, or the like) that is not illustrated, the transmission mechanism 50 transmits the drive force in the forward rotation direction (the arrow 45X direction) from the drive motor 45 to the drive roll 43A to rotate the drive roll 43A in the forward direction and transmits the drive force in the reverse rotation direction (the arrow 45Y direction) from the drive motor 45 to rotate the drive roll 43A in the reverse direction.

Guides 71 and 72

The guides 71 and 72 illustrated in FIG. 2 are guide portions guiding the recording medium P. As illustrated in FIG. 2, the guide 71 is disposed on the upstream side in the transport direction with respect to the drive roll 41A and on the downstream side in the transport direction with respect to the fixing unit 26. Specifically, the guide 71 is disposed on the lower side with respect to the drive roll 41A. By the recording medium P coming into contact with a guide surface 71A facing the left side in FIG. 2, the guide 71 guides the recording medium P toward the downstream side in the transport direction (specifically, the contact region 41S of the drive roll 41A).

The guide 72 is disposed on the downstream side in the transport direction with respect to the drive roll 41A and on the upstream side in the transport direction with respect to the drive roll 42A. Specifically, in FIG. 2, the guide 72 is disposed on the diagonally upper right side with respect to the drive roll 41A and on the diagonally lower left side with respect to the drive roll 42A. By the recording medium P coming into contact with a guide surface 72A facing the upper side in FIG. 2, the guide 72 guides the recording medium P toward the downstream side in the transport direction (specifically, the contact region 42S of the drive roll 42A).

Guide 74

The guide 74 illustrated in FIG. 2 is a guide portion guiding the recording medium P. As illustrated in FIG. 2, the guide 74 is disposed on the downstream side in the transport direction with respect to the drive roll 41A and on the upstream side in the transport direction with respect to the drive roll 42A.

The guide 74 is rotatable between the discharge position where the discharge path is formed (the position indicated by a solid line in FIG. 2) and the inversion position where the inversion path is formed (the position indicated by a two-dot chain line in FIG. 2). At the discharge position, the guide 74 forms the discharge path (specifically, the path from the contact region 41S to the contact region 42S (see the arrow A2)) with the guide 72. The guide 74 guides the recording medium P on a guide surface 74A facing the lower side at the discharge position.

At the inversion position, the guide 74 forms the first inversion path (specifically, the path from the contact region 41S to the contact region 42T (see the arrow B2 in FIG. 6)) with the opening-closing bodies 81 and 82. The guide 74 guides the recording medium P on a guide surface 74B facing the left side at the inversion position.

As an example, the guide 74 is configured to be rotated to the discharge position and the inversion position using the drive force of the drive motor 45.

Opening-Closing Bodies 81 and 82

The opening-closing bodies 81 and 82 are examples of an opening-closing portion and are supported so as to be openable and closable with respect to the support frames 47 and 48. The opening-closing bodies 81 and 82 move relative to the support frames 47 and 48 including the drive rolls 41A and 42A, the drive motor 45, and the transmission mechanism 50 to be opened and closed.

Specifically, the opening-closing bodies 81 and 82 are opened and closed to the open position illustrated in FIG. 2 and the closed position illustrated in FIG. 10 by integrally rotating the other end side (specifically, the left end side) with one end side (specifically, the right end side of the opening-closing body 82) as a fulcrum. In FIGS. 2, 6, and 10, the rotating shaft (fulcrum) of the opening-closing bodies 81 and 82 is indicated by reference numeral 82S.

Further, the opening-closing bodies 81 and 82 have a function of guiding the recording medium P. The opening-closing body 81 is disposed on the left side with respect to the drive roll 41A. The opening-closing body 81 has a guide surface 81A facing the guide 71 and a guide surface 81B facing the opening-closing body 82 side (the diagonally upper left side in FIG. 2). In the opening-closing body 81, the recording medium P is guided toward the downstream side in the transport direction (specifically, the contact region 41S of the drive roll 41A) by coming into contact with the guide surface 81A. In addition, in the opening-closing body 81, the recording medium P is guided toward the downstream side in the transport direction (specifically, the contact region 43S of the drive roll 43A) by coming into contact with the guide surface 81B.

Further, as described above, the driven roll 41B is rotatably supported by the opening-closing body 81, and the driven roll 41B moves integrally with the opening-closing body 81.

The opening-closing body 82 is disposed on the upper side with respect to the opening-closing body 81, the guide 74, and the drive roll 42A. The opening-closing body 82 has a guide surface 82A facing the guide surface 81B of the opening-closing body 81. In the opening-closing body 82, the recording medium P is guided toward the downstream side in the transport direction (specifically, the contact region 43S of the drive roll 43A) by coming into contact with the guide surface 82A. Further, the driven roll 42C is rotatably supported in one end portion (specifically, the right end portion) of the opening-closing body 82, and the driven roll 42C moves integrally with the opening-closing body 82. In addition, the drive roll 43A and the driven roll 43B are rotatably supported in the other end portion (specifically, the left end portion) of the opening-closing body 82, and the drive roll 43A and the driven roll 43B move integrally with the opening-closing body 82.

In a case where, for example, the discharge path (see the arrows A1 and A2 in FIG. 2) and the inversion path (see the arrows B1, B2, and B3 in FIG. 6) are clogged with the recording medium P (so-called jam), the opening-closing bodies 81 and 82 are opened and closed so that the clogging is eliminated. In addition, the opening and closing of the opening-closing bodies 81 and 82 are performed in, for example, a state where an exterior cover (not illustrated) provided on the image forming apparatus main body 11 and covering the opening-closing bodies 81 and 82 is open.

Action According to Present Embodiment

In the present exemplary embodiment, the transmission mechanism 50 transmits the drive force in the forward rotation direction (the arrow 45X direction) output from the drive motor 45 to the drive rolls 41A and 42A to rotate the drive rolls 41A and 42A in the forward direction. In addition, the transmission mechanism 50 transmits the drive force in the reverse rotation direction (the arrow 45Y direction) output from the drive motor 45 to the drive rolls 41A and 42A to rotate the drive roll 41A in the forward direction and rotate the drive roll 42A in the reverse direction.

Accordingly, the number of drive motors is reduced and an increase in the size of the second transporting device 40 and an increase in the size of the image forming apparatus 10 are suppressed as compared with a case where the transmission mechanism 50 transmits the drive force of the drive motor 45 to rotate the drive rolls 41A and 42A in the forward direction and transmits the drive force of a drive motor different from the drive motor 45 to rotate the drive roll 41A in the forward direction and the drive roll 42A in the reverse rotation.

In the present exemplary embodiment, the transmission mechanism 50 has the first transmission path 50A and the second transmission path 50B. The first transmission path 50A transmits the drive force in the forward rotation direction (the arrow 45X direction) output from the drive motor 45 to the drive rolls 41A and 42A to rotate the drive rolls 41A and 42A in the forward direction and does not transmit the drive force in the reverse rotation direction (the arrow 45Y direction) output from the drive motor 45 to the drive roll 41A. The second transmission path 50B transmits the drive force in the reverse rotation direction (the arrow 45Y direction) output from the drive motor 45 to the drive rolls 41A and 42A to rotate the drive roll 41A in the forward direction and rotate the drive roll 42A in the reverse direction and does not transmit the drive force in the forward rotation direction (the arrow 45X direction) output from the drive motor 45 to the drive roll 41A.

Since the transmission mechanism 50 has the first transmission path 50A and the second transmission path 50B as described above, transmission path configuration and/or control is not complicated and the configuration and/or control of the second transporting device 40 and the image forming apparatus 10 being complicated is suppressed as compared with a case where the rotation directions of the drive rolls 41A and 42A are controlled simply with a single transmission path.

In addition, in the transmission mechanism 50, the gears 51, 52, 53, 54, and 55 and the one-way clutch 521 are disposed on one axial end side (specifically, the rear end side) of the drive rolls 41A and 42A, and the pulleys 61 and 62, the timing belt 66, and the one-way clutch 611 are disposed on the other axial end side (specifically, the front end side) of the drive rolls 41A and 42A.

Accordingly, the second transporting device 40 is space-saving as compared with a case where the gears 51, 52, 53, 54, and 55, the one-way clutches 521 and 611, the pulleys 61 and 62, and the timing belt 66 are disposed on one axial end side (specifically, the rear end side or the front end side) of the drive rolls 41A and 42A.

In addition, in the present exemplary embodiment, the opening-closing bodies 81 and 82 move relative to the support frames 47 and 48 including the drive rolls 41A and 42A, the drive motor 45, and the transmission mechanism 50 to be opened and closed.

Accordingly, a change in the positional relationship of the drive rolls 41A and 42A, the drive motor 45, and the transmission mechanism 50 is suppressed as compared with a case where the drive rolls 41A and 42A, the drive motor 45, and a part of the transmission mechanism 50 move relative to the support frames 47 and 48 together with the opening-closing bodies 81 and 82.

In addition, in the present exemplary embodiment, the drive roll 42A transports the recording medium P with the driven roll 42B by forward rotation and transports the recording medium P with the driven roll 42C by reverse rotation. Accordingly, the number of components is reduced and an increase in the size of the second transporting device 40 and an increase in the size of the image forming apparatus 10 are suppressed as compared with a case where the driven roll 42C transports the recording medium P by a transport member different from the drive roll 42A.

Modification Example of Image Forming Unit 14

The present invention is not limited to the present exemplary embodiment in which the image forming unit 14 that is an intermediate transfer method is used as an example of an image forming unit. As an example of an image forming unit, for example, a direct transfer method may be used in which each of the toner image forming units 20Y to 20K directly forms a toner image on the recording medium P not via the transfer body 24. In an example of an image forming unit, an image forming unit may eject ink to the recording medium P to form an image, and the unit has only to have a function of forming an image on the recording medium P.

Modification Example of Second Transporting Device 40

The present invention is not limited to the present exemplary embodiment in which the second transporting device 40 is provided in the image forming apparatus 10 as an example of a transporting device and a rotating device. An example of a transporting device may be provided in an apparatus having a function other than the function of image formation (for example, image reading, heating, and cutting) or the transporting device may be used alone.

Further, an example of a rotating device may be configured as a device not intended for transport insofar as the device includes a first rotating body capable of forward rotation and a second rotating body capable of forward rotation and reverse rotation.

Modification Example of Recording Medium P

The present invention is not limited to the present exemplary embodiment in which the recording medium P is used as an example of a material to be transported. For example, an example of a material to be transported may be transported for a purpose other than image formation (for example, image reading, heating, and cutting) or being transported may be the only purpose thereof.

Modification Examples of Drive Rolls 41A and 42A

The present invention is not limited to the present exemplary embodiment in which the drive roll 41A is used as an example of a first transport member and a first rotating body. An example of a first transport member may be a transport member such as a transport drum and a transport belt. An example of a first rotating body may be a drum other than a transport drum, an annular belt other than a transport belt, or the like insofar as forward rotation is possible.

The present invention is not limited to the present exemplary embodiment in which the drive roll 42A is used as an example of a second transport member and a second rotating body. An example of a second transport member may be a transport member such as a transport drum and a transport belt. An example of a second rotating body may be a drum other than a transport drum, an annular belt other than a transport belt, or the like insofar as forward rotation and reverse rotation are possible.

Modification Examples of Driven Rolls 42B and 42C

The present invention is not limited to the present exemplary embodiment in which the driven roll 42B is used as an example of a third transport member and the driven roll 42C is used as an example of a fourth transport member. Examples of third and fourth transport members may be a transport member such as a transport drum and a transport belt.

Modification Example of Transmission Mechanism 50

The present invention is not limited to the present exemplary embodiment in which the transmission mechanism 50 transmits the drive force of the drive motor 45 to the drive rolls 41A, 42A, and 43A, and any mechanism may be used insofar as the drive force of the drive motor 45 is transmitted to at least the drive rolls 41A and 42A. The transmission mechanism 50 may be configured to transmit the drive force of the drive motor 45 to a configuration portion other than the drive rolls 41A, 42A, and 43A.

Although the gears 51, 52, 53, 54, and 55 are used in the transmission mechanism 50, a transmission member such as a pulley and a belt may replace the gears in whole or in part. Accordingly, as an example of a first transmission member, a transmission member such as a pulley and a belt may be used without being limited to the gear 52.

Although the pulleys 61 and 62 and the timing belt 66 are used in the transmission mechanism 50, a transmission member such as a gear may replace the pulleys 61 and 62 and the timing belt 66. Accordingly, as an example of a second transmission member, a transmission member such as a gear may be used without being limited to the pulley 61.

Modification Examples of Support Frames 47 and 48

The present invention is not limited to the present exemplary embodiment in which the support frames 47 and 48 as examples of a support body are formed in a plate shape in which the front-rear direction is the thickness direction. For example, the support frames 47 and 48 may be formed in a block shape (for example, a cube or a rectangular parallelepiped) or a box shape, and the support frames 47 and 48 are capable of varying in shape. An example of a support body has only to be capable of supporting each configuration portion of the second transporting device 40 including the drive rolls 41A and 42A, the drive motor 45, and the transmission mechanism 50.

Modification Examples of Opening-closing Bodies 81 and 82

The present invention is not limited to the present exemplary embodiment in which the opening-closing bodies 81 and 82 as examples of an opening-closing portion have a function of guiding the recording medium P and are opened and closed so that, for example, clogging with the recording medium P is eliminated. For example, an example of the opening-closing portion may be a cover (that is, a lid) solely for covering a configuration portion of the apparatus or may be opened and closed with respect to a support body such as the support frames 47 and 48.

The present invention is not limited to the above embodiment, and various modifications, changes, and improvements can be made without departing from the gist thereof. For example, the above modification examples may be combined as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A rotating device comprising: a first rotating body capable of forward rotation;

a second rotating body capable of forward rotation and reverse rotation;

a drive unit outputting drive forces in a forward rotation direction and a reverse rotation direction; and a transmission mechanism transmitting the drive force in the forward rotation direction output from the drive unit to the first rotating body and the second rotating body to rotate the first rotating body and the second rotating body in the forward direction and transmitting the drive force in the reverse rotation direction output from the drive unit to the first rotating body and the second rotating body to rotate the first rotating body in the forward direction and rotate the second rotating body in the reverse direction.

2. The rotating device according to claim 1, wherein the transmission mechanism includes:

a first transmission path transmitting the drive force in the forward rotation direction output from the drive unit to the first rotating body and the second rotating body to rotate the first rotating body and the second rotating body in the forward direction and not transmitting the drive force in the reverse rotation direction output from the drive unit to the first rotating body; and a second transmission path transmitting the drive force in the reverse rotation direction output from the drive unit to the first rotating body and the second rotating body to rotate the first rotating body in the forward direction and rotate the second rotating body in the reverse direction and not transmitting the drive force in the forward rotation direction output from the drive unit to the first rotating body.

3. The rotating device according to claim 2, wherein the first transmission path includes a first transmission member disposed on one axial end side of the first rotating body and transmitting the drive force in the forward rotation direction output from the drive unit to the first rotating body, and the second transmission path includes a second transmission member disposed on the other axial end side of the first rotating body and transmitting the drive force in the reverse rotation direction output from the drive unit to the first rotating body.

4. The rotating device according to claim 3, further comprising:

a support body supporting the first rotating body, the second rotating body, the drive unit, and the transmission mechanism; and an opening-closing portion moving relative to the support body including the first rotating body, the second rotating body, the drive unit, and the transmission mechanism to be opened and closed.

5. A transporting device as the rotating device according to claim 4, wherein the first rotating body is a first transport member transporting a material to be transported by forward rotation, and the second rotating body is a second transport member transporting a material to be transported by forward rotation and reverse rotation.

6. The transporting device according to claim 5, wherein the second transport member transports the material to be transported with a third transport member by forward rotation and transports the material to be transported with a fourth transport member disposed on a side opposite to the third transport member with respect to the second transport member by reverse rotation.

7. A transporting device as the rotating device according to claim 3, wherein the first rotating body is a first transport member transporting a material to be transported by forward rotation, and the second rotating body is a second transport member transporting a material to be transported by forward rotation and reverse rotation.

8. The transporting device according to claim 7, wherein the second transport member transports the material to be transported with a third transport member by forward rotation and transports the material to be transported with a fourth transport member disposed on a side opposite to the third transport member with respect to the second transport member by reverse rotation.

9. The rotating device according to claim 2, further comprising:

a support body supporting the first rotating body, the second rotating body, the drive unit, and the transmission mechanism; and an opening-closing portion moving relative to the support body including the first rotating body, the second rotating body, the drive unit, and the transmission mechanism to be opened and closed.

10. A transporting device as the rotating device according to claim 9, wherein the first rotating body is a first transport member transporting a material to be transported by forward rotation, and the second rotating body is a second transport member transporting a material to be transported by forward rotation and reverse rotation.

11. The transporting device according to claim 10, wherein the second transport member transports the material to be transported with a third transport member by forward rotation and transports the material to be transported with a fourth transport member disposed on a side opposite to the third transport member with respect to the second transport member by reverse rotation.

12. A transporting device as the rotating device according to claim 2, wherein the first rotating body is a first transport member transporting a material to be transported by forward rotation, and the second rotating body is a second transport member transporting a material to be transported by forward rotation and reverse rotation.

13. The transporting device according to claim 12, wherein the second transport member transports the material to be transported with a third transport member by forward rotation and transports the material to be transported with a fourth transport member disposed on a side opposite to the third transport member with respect to the second transport member by reverse rotation.

14. The rotating device according to claim 1, further comprising:

a support body supporting the first rotating body, the second rotating body, the drive unit, and the transmission mechanism; and an opening-closing portion moving relative to the support body including the first rotating body, the second rotating body, the drive unit, and the transmission mechanism to be opened and closed.

15. A transporting device as the rotating device according to claim 14, wherein the first rotating body is a first transport member transporting a material to be transported by forward rotation, and the second rotating body is a second transport member transporting a material to be transported by forward rotation and reverse rotation.

16. The transporting device according to claim 15, wherein the second transport member transports the material to be transported with a third transport member by forward rotation and transports the material to be transported with a fourth transport member disposed on a side opposite to the third transport member with respect to the second transport member by reverse rotation.

17. A transporting device as the rotating device according to claim 1, wherein the first rotating body is a first transport member transporting a material to be transported by forward rotation, and the second rotating body is a second transport member transporting a material to be transported by forward rotation and reverse rotation.

18. The transporting device according to claim 17, wherein the second transport member transports the material to be transported with a third transport member by forward rotation and transports the material to be transported with a fourth transport member disposed on a side opposite to the third transport member with respect to the second transport member by reverse rotation.

19. An image forming apparatus comprising:

an image forming unit forming an image on a recording medium as the material to be transported; and the transporting device according to claim 17 transporting the recording medium where the image is formed by the image forming unit.

20. The image forming apparatus according to claim 19, wherein the transporting device is the transporting device according to claim 18, and the second transport member transports the material to be transported with a third transport member by forward rotation and transports the material to be transported with a fourth transport member disposed on a side opposite to the third transport member with respect to the second transport member by reverse rotation.

* * * * *